(12) United States Patent
Wilson

(10) Patent No.: US 6,381,073 B1
(45) Date of Patent: Apr. 30, 2002

(54) SINGLE REFRACTIVE ELEMENT AND SEGMENTED MIRROR MULTIPLE BEAM SPACER

(75) Inventor: James M. Wilson, Glendora, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/732,103

(22) Filed: Dec. 5, 2000

(51) Int. Cl.[7] .................... G02B 27/14; B41J 2/455
(52) U.S. Cl. ................ 359/629; 359/636; 359/839; 359/855; 359/204; 347/233; 347/238
(58) Field of Search ................ 359/204, 209, 359/210, 211, 618, 627, 629, 636, 837, 839, 850, 855; 347/233, 238; 358/482, 494

(56) References Cited

U.S. PATENT DOCUMENTS

| 4,040,726 | A | * | 8/1977 | Paca |
| 4,686,542 | A | * | 8/1987 | Yip et al. |
| 5,025,438 | A | * | 6/1991 | Emoto |
| 5,272,715 | A | * | 12/1993 | Guerin |
| 5,557,475 | A | | 9/1996 | Nightingale et al. ........ 359/831 |
| 5,566,024 | A | | 10/1996 | Rauch ........................ 359/571 |
| 6,037,965 | A | * | 3/2000 | Gross et al. |

* cited by examiner

Primary Examiner—Ricky D. Shafer
(74) Attorney, Agent, or Firm—William Propp

(57) ABSTRACT

A segmented mirror with alternating reflective and transmissive surfaces and a refractive tilt place which laterally displaces two parallel beams are used as a beam spacer. A first beam is reflected by the segmented mirror and a second beam is transmitted by the segmented mirror. A third beam is refracted and laterally displaced by the tilt plate then reflected by the segmented mirror while a fourth beam is beam is refracted and laterally displaced by the tilt plate then transmitted by the segmented mirror. The segmented mirror and the refractive tilt plate closely space four parallel laser beams.

4 Claims, 3 Drawing Sheets

SINGLE REFRACTIVE ELEMENT AND SEGMENTED MIRROR MULTIPLE BEAM SPACER

BACKGROUND OF THE INVENTION

The present invention relates to a multiple beam spacer and, more particularly, to a single refractive optical element and a segmented mirror which control the separation between four parallel laser beams.

Printing systems will use a raster output scanning (ROS) system to have a modulated light beam strike the facets of a rotating polygon mirror and scan in a raster pattern across a photoreceptor. High speed or color printing requires a multiple beam light source.

One possible multiple beam light source is a lager diode array. However, placing two or more laser diodes in a single array creates practical difficulties including phase locking of the emitted laser beams and electrical and thermal interference between the adjacent laser beams.

Another approach to providing a multiple beam light source is to integrate individual lager diodes to form the multiple light beam source. In a ROS system, it is beneficial to have the rotating polygon as thin as possible. Thicker polygons cost more and require larger, higher power and more expensive motors and drivers. A four parallel beam ROS therefore requires that the four beams be closely spaced in order to enable a thin polygon.

The major problem with integrating individual laser diodes into a multiple beam light source is the large spacing between the individual laser diodes caused by the physical size of the laser diodes themselves. The spacing or pitch between two adjacent individual laser diodes can be 100 microns or larger while the required spacing of the two adjacent light beams for printing uses is 25 microns or less, a difference of a factor of four or greater. Also multiple laser beam systems are often required to have beam to beam spacing that is considerably different in different parts of the system.

A beam spacer uses optical elements to expand or contract the pitch or spacing between light beams.

Current technology can use mirrors and lenses as beam spacers. However, manufacturing these optical elements on such a small micron scale requires expensive, extensive fabrication and align the various optical elements on an even smaller scale mandates a precision assembly.

Beam combiners, as their name indicates, are optical elements that combine two or more light beams into a single overlapping composite beam. These are distinctly different optical elements from beam spacers which move light beams closer without combining the beams.

Beam splitter prisms can be used as beam spacer elements, but this approach reduces the intensity of the output beam by half due to light loss caused by splitting the beam. A tilt plate and a pair of beam steering prisms (or a second tilt plate) are used to split a wide horizontal beam into two smaller vertically aligned beams in U.S. Pat. No. 5,557,475 to improve the brightness symmetry of the beam.

One possible beam spacer is found in U.S. Pat. No. 5,566,024, commonly assigned as the present application and herein incorporated by reference. Two sets of two single blazed binary diffractive optical elements form a beam spacer for contracting two wider spaced parallel beams into two closely spaced parallel beams.

It is an object of the present invention to provide a multiple beam separation spacer of a single refractive optical element and a segmented mirror which control the spacing between four parallel laser beams.

SUMMARY OF THE INVENTION

According to the present invention, a segmented mirror with alternating reflective and transmissive surfaces and a refractive tilt place which laterally displaces two parallel beams are used as a beam spacer.

A first beam is reflected by the segmented mirror and a second beam is transmitted by the segmented mirror. A third beam is refracted and laterally displaced by the tilt plate then reflected by the segmented mirror while a fourth beam is beam is refracted and laterally displaced by the tilt plate then transmitted by the segmented mirror. The segmented mirror and the refractive tilt plate closely space four parallel laser beams.

Other objects and attainments together with a fuller understanding of the invention will become apparent and appreciated by referring to the following description and claims taken in conjunction with the accompanying drawings.

DESCRIPTION OF THE INVENTION

Figure 1:
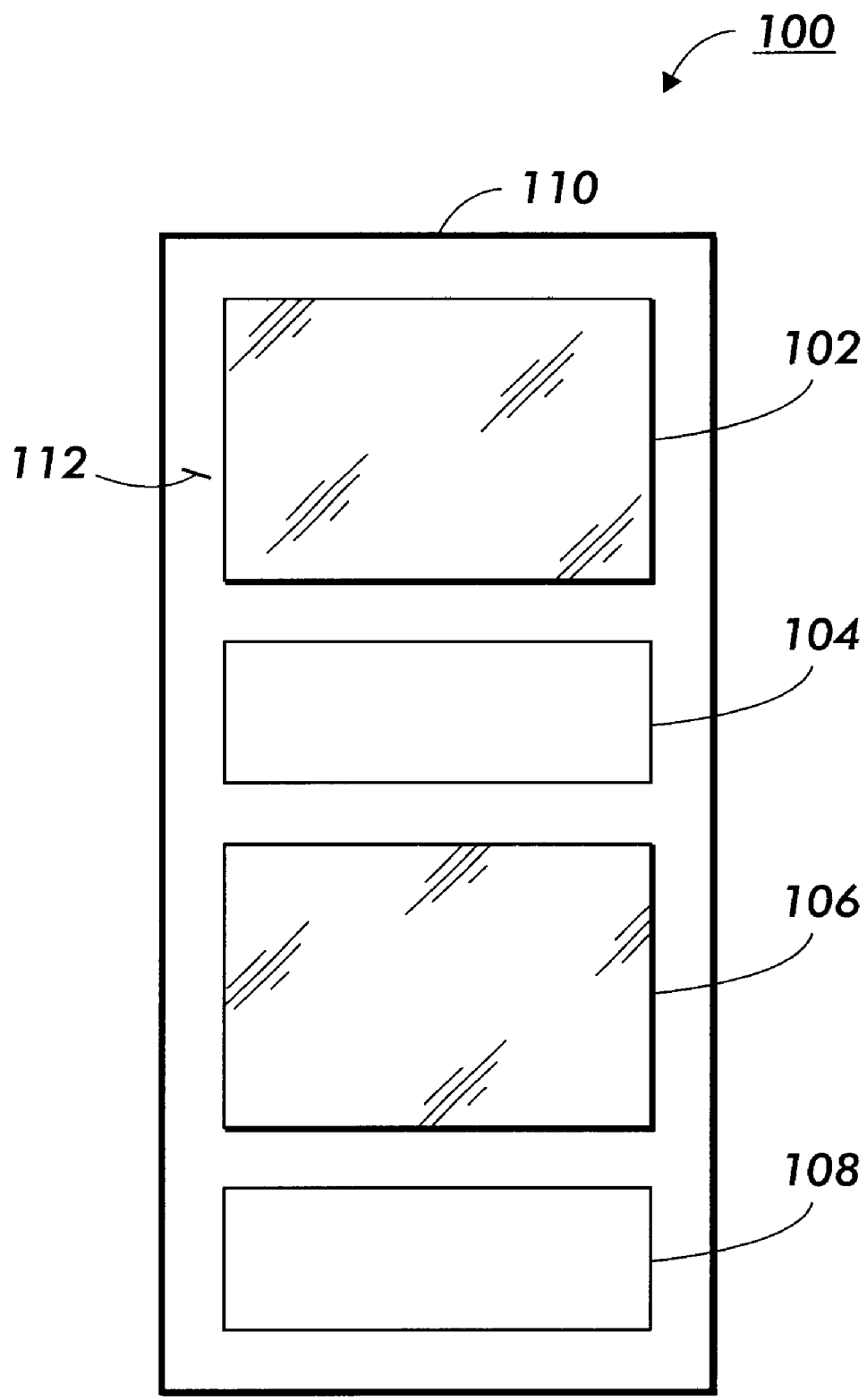
FIG. 1 illustrates a segmented mirror of the beam spacer of the present invention.

Reference is now made to FIG. 1 illustrating the segmented mirror 100 for spacing four laser beams of the beam spacer of the present invention.

The segmented mirror 102 of the beam spacer 100 of FIGS. 1, 3, 4 and 5 has a first reflective surface 102, a first transmissive surface 104, a second reflective surface 106 and a second transmissive surface 108 on a rigid frame 110. The segmented mirror 100 is arranged in a vertical design with alternating reflective 102, 106 and transmissive 104, 108 surfaces.

The reflective surfaces 102 and 106 are reflective to the wavelength of light being emitted by the laser sources. Typically, the reflective surfaces will be aluminum or some other metallic surface. In this example, aluminum reflective surfaces 102 and 106 are deposited on the front surface 112 of the plastic frame 110.

The transmissive surfaces 104 and 108 are transmissive to the wavelength of light being emitted by the laser sources. Typically, the transmissive surfaces will be clear glass or a physical hole. In this example, glass plate transmissive surfaces 104 and 108 extend through the plastic frame 110 from the back surface 114 to the front surface 112.

Figure 2:
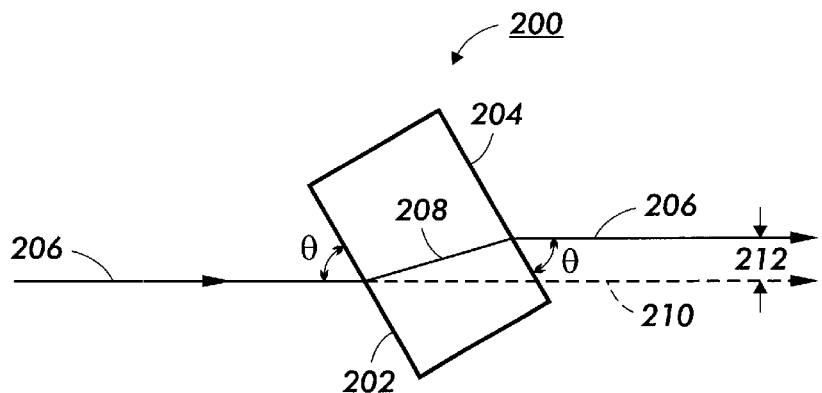
FIG. 2 illustrates a refractive tilt plate of the beam spacer of the present invention.

Reference is now made to FIG. 2 illustrating the refractive tilt plate 200 for laterally displacing two beams for closer spacing four laser beams of the beam spacer of the present invention.

The refractive tilt plate 200 is a single solid element formed of a material that transmits light of the wavelength of the incident laser beams and has a uniform index of refraction throughout the material. Examples of the tilt plate material would include plastics and BK7 glass, as are known in the art.

The tilt plate 200 is cubic rectangular in shape and has a single common angled planar input surface and an opposing angled planar output surface. The input surface 202 of the refractive plate 200 is parallel to the output surface 204.

A light beam 206 will be incident upon the input surface 202 of the refractive tilt plate 200 at an angle θ. The light beam 206 will refract at the input surface 202 and travel through the length 208 of the refractive tilt plate 200.

The light beam 206 will then refract at the output surface 204 of the refractive tilt plate 200 at an angle θ. The angle of incidence and the exit angle are the same. The input surface 202 of the refractive plate 200 is parallel to the output surface 204.

The light beam 206 has been displaced laterally by the refractive tilt plate 200 from its unrefracted position 210 by a distance 212. The amount of lateral displacement is proportional to the length 208 of the refractive tilt plate.

$$d = t \sin\theta(1 - (n\cos\theta/n1\cos\theta1)) \quad \text{Equation 1}$$

where d is the distance of lateral beam displacement, t is the length of the refractive tilt plate, n is the index of refraction of the tilt plate, θ is the angle of incidence of the beam from the normal to the tilt plate, n1 is the index of refraction of the surrounding environment of air and θ1 is the angle of incident of the beam from the normal inside the tilt plate.

The segmented mirror 100 of FIG. 1 and the refractive tilt plate 200 of FIG. 2 form the beam spacer of the present invention for closely spacing four parallel beams.

Figure 3:
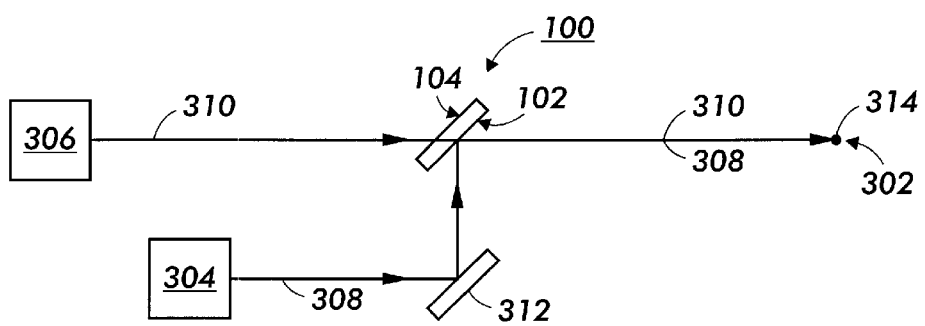
FIG. 3 illustrates a side view of the segmented mirror of the beam spacer for closely spacing the first pair of beams of the present invention.
Figure 5:
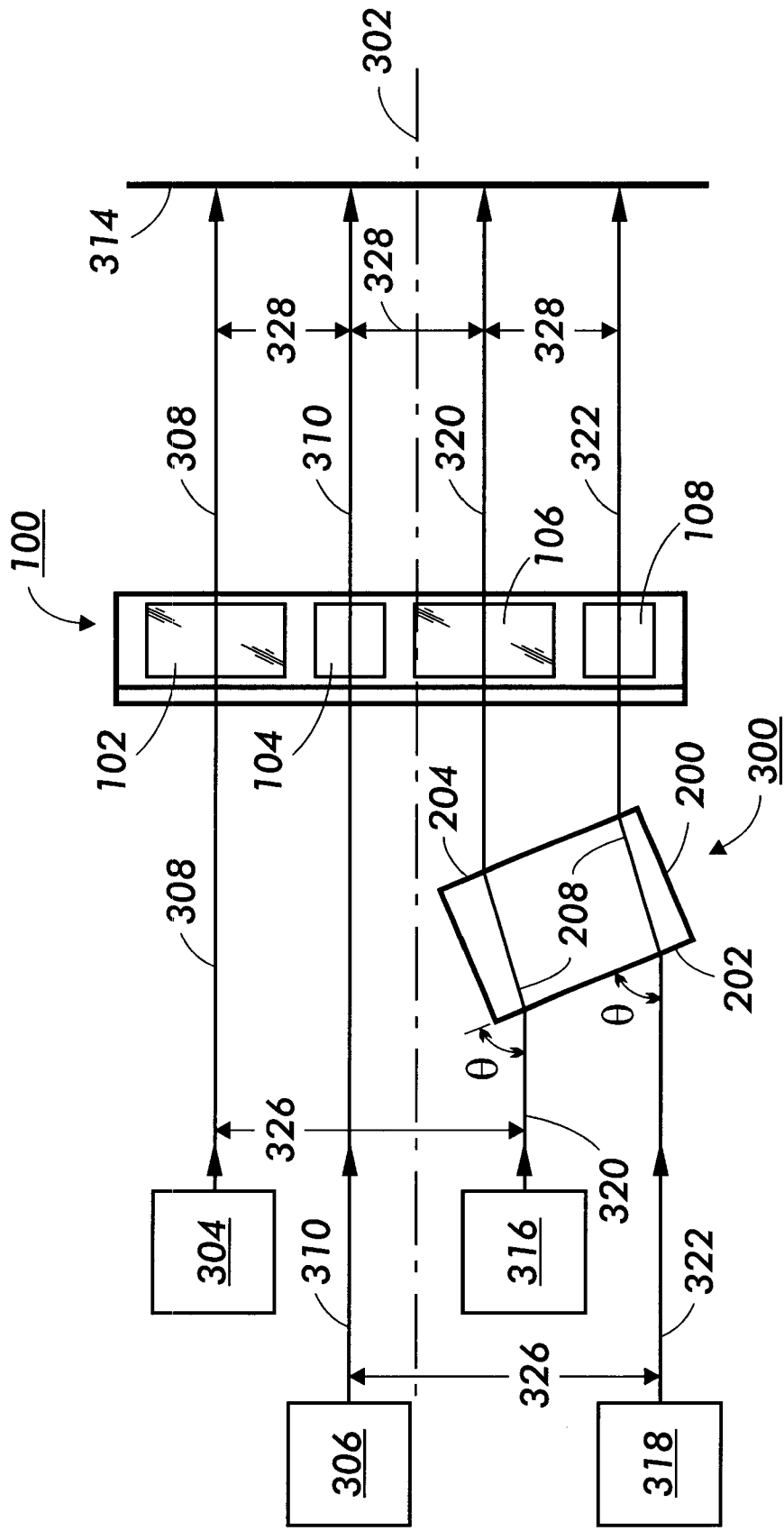
FIG. 5 illustrates a top view of the refractive tilt plate and segmented mirror of the beam spacer for closely spacing all four beams of the present invention.

As shown in the side view of FIG. 3 and the top view of FIG. 5, the segmented mirror 100 of the beam spacer 300 is positioned at a 45 degree angle of the front surface 112 to the optical axis 302.

A first laser diode 304 is positioned vertically displaced below the segmented mirror 100. A second laser diode 306 is positioned in the same plane as the segmented mirror 100.

The first laser diode 304 will emit a first laser beam 308. The second laser diode 306 will emit a second laser beam 310. The two laser beams 308 and 310 have the same wavelength.

The first laser beam 308, after emission by the first laser diode 304, will be reflected by the first turn mirror 312. The reflected first laser beam 308 will be incident on the first reflective surface 102 on the front surface 112 of the segmented mirror 100 of the beam spacer 300 and reflected parallel to the optical axis 302 to the scan line 314. The scan line 314 is perpendicular to the optical axis 302, as seen in FIG. 5.

Returning to FIG. 3, the second laser beam 310, after emission by the second laser diode 306, will be incident on the first transmissive surface 104 on the back surface 114 of the segmented mirror 100. The laser beam 310 will be transmitted through the transmissive surface 104 to the front surface 112 and propagate parallel to the optical axis 302 to the scan line 314.

The first laser beam 122 and the second laser beam 124 are parallel at the scan line 314 after reflection and transmission from the segmented mirror 100 of the beam spacer 300.

Figure 4:
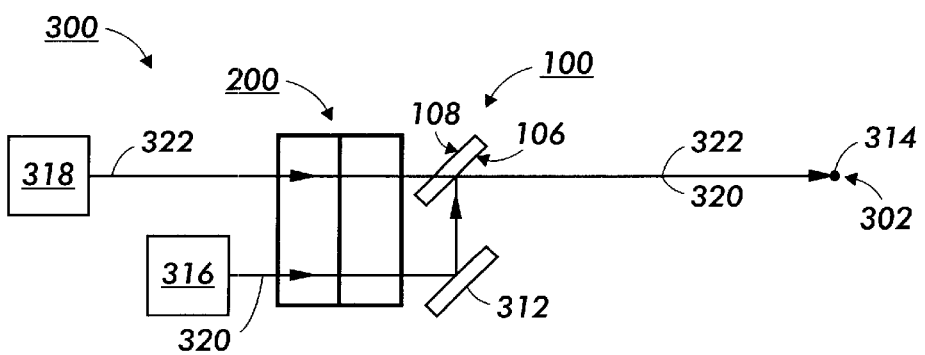
FIG. 4 illustrates a side view of the refractive tilt plate and the segmented mirror of the beam spacer for closely spacing the second pair of beams of the present invention.

As shown in the side view of FIG. 4 and the top view of FIG. 5, the segmented mirror 100 of the beam spacer 300 is positioned at a 45 degree angle of the front surface 112 to the optical axis 302, and the refractive tilt plate 200 is positioned to laterally displace beams toward the optical axis 302 and the other beams.

A third laser diode 316 is positioned vertically displaced below the segmented mirror 100. A fourth laser diode 318 is positioned in the same plane as the segmented mirror 100.

The third laser diode 316 will emit a third laser beam 320. The fourth laser diode 318 will emit a fourth laser beam 322. The two laser beams 320 and 322 have the same wavelength as the first and second laser beams.

The third laser beam 320, after emission by the third laser diode 316, will be incident upon the input surface 202 of the refractive tilt plate 200 at an angle θ. The third laser beam 320 will refract at the input surface 202 and travel through the length 208 of the refractive tilt plate 200.

The third laser beam 320 will then refract at the output surface 204 of the refractive tilt plate 200 at an angle θ. The angle of incidence and the exit angle are the same. The input surface 202 of the refractive plate 200 is parallel to the output surface 204.

As seen in FIG. 5, the third laser beam 320 has been displaced laterally by the refractive tilt plate 200 to be closer in spacing or pitch to the adjacent beam 310. The amount of lateral displacement is proportional to the length 208 of the refractive tilt plate.

The third laser beam 320, after refraction by the tilt plate 200, will be reflected by the second turn mirror 324. The reflected third laser beam 320 will be incident on the second reflective surface 106 on the front surface 112 of the segmented mirror 100 and reflected parallel to the optical axis 302 to the scan line 314.

The fourth laser beam 322, after emission by the fourth laser diode 318, will be incident upon the input surface 202 of the refractive tilt plate 200 at an angle θ. The angle of incidence θ of the fourth laser beam to the input surface of the refractive tilt plate is the same as the angle of incidence θ of the third laser beam to the input surface of the refractive tilt plate.

The fourth laser beam 322 will refract at the input surface 202 and travel through the length 208 of the refractive tilt plate 200. The fourth laser beam 322 will then refract at the output surface 204 of the refractive tilt plate 200 at an angle θ. The angle of incidence and the exit angle are the same. The input surface 202 of the refractive plate 200 is parallel to the output surface 204.

As seen in FIG. 5, the fourth laser beam 332 has been displaced laterally by the refractive tilt plate 200 to be closer in spacing or pitch to the adjacent beam 320. This lateral displacement of the fourth laser beam is the same as the lateral displacement of the third laser beam. The amount of lateral displacement is proportional to the length 208 of the refractive tilt plate.

The fourth laser beam 322, after refraction by the tilt plate 200, will be incident on the second transmissive surface 108 on the back surface 114 of the segmented mirror 100. The laser beam 322 will be transmitted through the transmissive surface 108 to the front surface 112 and propagate parallel to the optical axis 302 to the scan line 314.

The third laser beam 320 and the fourth laser beam 322 are parallel at the scan line 314 after lateral displacement by the refractive tilt plate 200 and after reflection and transmission from the segmented mirror 100, and parallel to the first and second laser beams.

The first laser beam 308 and the third laser beam 320 are in the same horizontal plane, are parallel and are separated by a first spacing distance 326 before the beams are incident upon the beam spacer 300. The second laser beam 310 and the fourth laser beam 322 are in the same horizontal plane, which is different from the horizontal plane of the first and third beams. The second laser beam 310 and the fourth laser beam 322 are parallel and are also separated by the same first spacing distance 326, as the first and third beams, before the second and fourth beams are incident upon the beam spacer 300.

The segmented mirror 100 of the beam spacer 300 interlaces the first and third laser beams with the second and fourth laser beams while the refractive tilt plate 200 of the beam spacer 300 laterally displaces the third and fourth beams closer to the first and second beams. The first, second, third and fourth light beams after the beam spacer are in the same horizontal plane as the scan line and optical axis even as the first and third beam were initially emitted vertically displaced from that horizontal plane.

Thus, the first laser beam 308 and the adjacent second laser beam 310 are separated by a second spacing distance 328 at the scan line 314. The second laser beam 310 and the adjacent third laser beam 320 are also separated by the same second spacing distance 328 at the scan line 314 as the first and second laser beams. The third laser beam 320 and the adjacent fourth laser beam are also separated by the same second spacing distance 328 at the scan line 314 as the first and second beams and the second and third beams.

The second spacing distance 328 between the beams after reflection and transmission by the segmented mirror 100 and refraction by the tilt plate 2000 is less than the first spacing distance 326 between the beams before the beam spacer 300.

The segmented mirror and the refractive tilt plate of the beam spacer of the present invention closely space four parallel laser beams.

The single refractive tilt plate 200 for the third and fourth laser beams can be alternatively two refractive tilt plates, one tilt plate for each beam.

The input and output surfaces of the tilt plate typically have an antireflection coating to increase refraction of the laser beam.

Alternately, the rigid frame of the segmented mirror of the beam spacer of the present invention can be constructed from an optically transmissive material such as glass. The thin metallic reflective segments can be deposited on the front surface of the glass. The transmissive segments would be optically transmissive segments of the frame itself.

Also alternately, the metalized reflecting surface may be either the air-reflector interface on which the incident light first strikes, or, if all the materials are sufficiently transparent, the impinging light may travel through these materials and be reflected by a mirroring material on the back side. The latter generally would be preferable to protect the metalized surface, and to facilitate cleaning of the exposed surface.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A beam spacer for closely spacing four light beams comprising:
    a first laser source for emitting a first light beam,
    a second laser source for emitting a second light beam,
    a third laser source for emitting a third light beam, said first light beam and said third light beam being separated by a first spacing, said first light beam and said third light beam being parallel,
    a fourth laser source for emitting a fourth light beam, said second light beam and said fourth light beam being separated by said first spacing, said second light beam and said fourth light beam being parallel,
    a refractive tilt plate for refracting said third light beam, said refractive tilt plate for refracting said fourth light beam, and
    a segmented mirror having a first reflective surface for reflecting said first light beam to a scan line, a first transmissive surface for transmitting said second light beam to said scan line, a second reflective surface for reflecting said third light beam from said refractive tilt plate to said scan line, a second transmissive surface for transmitting said fourth light beam from said refractive tilt plate to said scan line, said reflective surfaces and said transmissive surfaces being alternating on said segmented mirror,
    wherein said first light beam, said second light beam, said third light beam and said fourth light beam are parallel at said scan line and have a second spacing less than said first spacing.

2. The beam spacer for closely spacing four light beams of claim 1 wherein said scan line is perpendicular to an optical axis running through said beam spacer, said first and third laser sources are vertically displaced from said optical axis and said second and fourth laser sources are parallel to said optical axis.

3. The beam spacer for closely spacing four light beams of claim 1 further comprising:
    said refractive tilt plate having an input surface for refracting said third light beam to an output surface, said output surface for refracting said third light beam to said segmented mirror, said input surface being parallel to said output surface, and
    said input surface refracting said fourth light beam to said output surface, said output surface for refracting said fourth light beam to said segmented mirror.

4. A beam spacer for closely spacing four light beams comprising:
    a first laser source for emitting a first light beam,
    a second laser source for emitting a second light beam,
    a third laser source for emitting a third light beam, said first light beam and said third light beam being separated by a first spacing, said first light beam and said third light beam being parallel,
    a fourth laser source for emitting a fourth light beam, said second light beam and said fourth light beam being separated by said first spacing, said second light beam and said fourth light beam being parallel,
    a first refractive tilt plate for refracting said third light beam,
    a second refractive tilt plate for refracting said fourth light beam, and
    a segmented mirror having a first reflective surface for reflecting said first light beam to a scan line, a first transmissive surface for transmitting said second light beam to said scan line, a second reflective surface for reflecting said third light beam from said first refractive tilt plate to said scan line, a second transmissive surface for transmitting said fourth light beam from said second refractive tilt plate to said scan line, said reflective surfaces and said transmissive surfaces being alternating on said segmented mirror,
    wherein said first light beam, said second light beam, said third light beam and said fourth light beam are parallel at said scan line and have a second spacing less than said first spacing.

* * * * *